3,600,369
PRODUCTION AND POWDER COATING OF POLY-
VINYLIDENE FLUORIDE POLYMER MATERIALS
Yasushi Toyoda, Hajime Ishii, and Nobuo Bannai, Iwaki-
shi, Japan, assignors to Kureha Kagaku Kogyo Kabu-
shiki Kaisha, Tokyo-to, Japan
Filed July 11, 1967, Ser. No. 656,308
Claims priority, application Japan, July 15, 1966,
41/45,897; Apr. 14, 1967, 42/23,743
Int. Cl. C08f 1/11, 3/22
U.S. Cl. 260—92.1                                                1 Claim

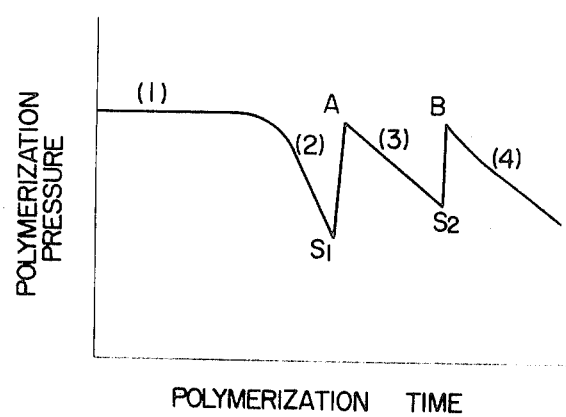

ABSTRACT OF THE DISCLOSURE

Suspension polymerization at a temperature below 40 degrees C. of a vinylidene fluoride monomer substance with at least one intermediate charge of supplementary vinylidene fluoride monomer at a time when the polymerization pressure drops is carried out to produce vinylidene fluoride polymer materials in the form of spherical particles having intrinsic viscosities of from 0.4 to 1.2, particle size distributions in the range of from 5 to 300 microns, and apparent densities of from 0.3 to 0.7 gram/cc. and having high suitability for powder coating to form film coatings having good properties.

---

This invention relates to polyvinylidene fluoride materials, to processes for producing the same, and to methods of applying the same to form good film coatings.

More particularly the invention concerns new polyvinylidene fluoride materials highly suitable for powder coating and a new process for producing these materials.

Heretofore, various resins have been widely used in practice as resins suitable for use in melt coating metal surfaces, typical examples being cellulose resins, nylons, polyethylenes, polyvinyl chlorides, and epoxy resins. Vinylidene fluoride polymers sold on the market, however, exhibit very high melt viscosities, for example, of the order of from $30 \times 10^4$ to $100 \times 10^4$ poise, whereby it is difficult to cause these polymers to form melt coatings, and this difficulty has greatly hindered the development of these polymers as coating material.

An exceptional method for forming coatings of polyvinylidene fluorides having such high molten viscosities has, to be sure, been proposed in U.S. Pats. 3,111,426 and 3,211,687 and in British Pat. 942,956, and it is known that coated articles produced by this method have excellent resistance to chemicals, weather conditions, heat, and other adverse conditions. However, since this method requires the use of large quantities of expensive solvents, its scope of application is substantially limited, and there has still been a great need of a resin material of equivalent character for low-cost powder coating.

According to processes known heretofore for polymerization of vinylidene fluoride, polymerization is caused to occur at a high temperature of 80 degrees C. or more (for example, as set forth in U.S. Pat. 3,193,539). A polymer produced by polymerization at such a high temperature has a high melt viscosity as mentioned hereinabove, whereby it cannot be used for powder coating.

While powder coating is possible with these polymers produced with lowered degree of polymerization for the purpose of lowering the melt viscosity, the coating film thus formed has heretofore been weak in impact strength and tensile strength and has been useless for practical purposes. Furthermore, since the critical temperature of vinylidene fluoride is 30.1 degrees C., it has been polymerized almost exclusively by emulsion polymerization in order to accomplish polymerization at high temperatures. For this reason, the resulting polymer has been of very small particle size, i.e., of the order of 0.1 to 1 micron and, therefore, has had a tendency to scatter and be lost when used for powder coating.

We have previously succeeded in polymerizing vinylidene fluoride by causing it to be suspended in water at a temperature below its critical temperature through the use of a radical forming catalyst such as a peroxycarbonate (as set forth in French Pat. 1,419,741). We have found that polyvinylidene fluorides prepared by such a low-temperature polymerization method have melting points and crystallization temperatures which are much higher than those of conventional polyvinylidene fluorides sold on the market and, in addition, are capable of forming tough films comparable to polyvinylidene fluorides heretofore sold on the market in spite of their low degree of polymerization.

We have found, moreover, that since a low degree of polymerization suffices in the case of these polymers, their melt viscosities are also low, whereby some of these polymers are highly suitable as resins for powder coating.

It is an object of the present invention to provide low-price vinylidene fluoride polymer materials suitable for powder coating thereof to form film coatings having excellent properties on articles.

Another object of the invention is to provide a low-cost process for producing vinylidene fluoride polymer materials of the above stated character.

A further object is to provide a relatively simple method of forming a film coating of excellent properties on articles by powder coating of vinylidene fluoride polymer materials.

According to the present invention, briefly summarized, there are provided vinylidene fluoride polymer materials suitable for powder coating which are in the form of spherical particles having an intrinsic viscosity of from 0.4 to 1.2, a particle size distribution in the range of from 5 to 300 microns, and an apparent density of from 0.3 to 0.7 gramme/cc.

According to the present invention there is further provided a process for producing vinylidene fluoride polymer materials of the above stated character which process is characterized by the steps of dissolving or dispersing a monomer substance with vinylidene fluoride as its principal constituent in or throughout water, acetone, an alcohol, or some other polar solvent, causing polymerization of the monomer substance at a temperature below 40 degrees C. in the presence of a suspension stabilizer through the use of a radical polymerization catalyst, and adding at least one charge of supplementary vinylidene fluoride monomer to the polymerization process when the polymerization pressure has substantially decreased, thereby causing the pressure to rise abruptly to a revival value approaching the initial pressure, each charge being limited to a quantity to cause the pressure to begin to decrease immediately upon reaching the revival value thereby to prevent polymerization of the monomer in the newly added charge.

The nature, basis, and details of the invention, as well as the utility thereof, will be more clearly apparent from the following detailed description. In the accompanying drawing, the single figure is a graphical representation showing the variation of polymerization pressure with polymerization time in one example of suspension polymerization in the process according to the invention.

The term "suspension polymerization" is used herein with respect to the present invention to designate the process of dissolving or dispersing vinylidene fluoride monomer in water or in acetone, an alcohol, or some other polar solvent and causing polymerization of the monomer in the presence of a suspension stabilizer through the use of a radical polymerization catalyst.

Examples of substances suitable for use as the suspension stabilizer in this suspension polymerization are methyl cellulose, ethyl cellulose, methylethyl cellulose, propyl cellulose, hydroxymethyl cellulose, hydroxyethyl cellulose, carboxymethylcellulose, polyvinyl alcohol, partially saponified polyvinyl alcohol, gelatins, and water-soluble high polymers used in the suspension polymerization of polymers such as polyvinyl chlorides.

Since it is necessary to suspend the vinylidene fluoride monomer in a liquid state in suspension polymerization, the polymerization, in general, is carried out at a temperature below the critical temperature (30.1 degrees C.) of the monomer. In the case where a water-soluble liquid such as acetone or methanol is used, however, the solvent is distributed throughout the vinylidene fluoride, whereby the apparent critical temperature thereof is somewhat higher, and it is possible, therefore, to carry out suspension polymerization at a temperature which is higher than the critical temperature of vinylidene fluoride. However, since an increase in the polymerization temperature gives rise to an impairment of the physical properties of the polymer, it is desirable that the polymerization be carried out at a temperature below 40 degrees C.

The polyvinylidene fluorides used in accordance with the present invention ordinarily have crystallization temperatures of over 140 degrees C. and melting points of over 175 degrees C. as measured by the peaks in differential thermal analysis. In spite of these very high melting points, these polyvinylidene fluorides exhibit low values of melt viscosity of from $2 \times 10^3$ to $10 \times 10^4$ poise at 20 degrees C. and, moreover, are highly stable when exposed for long periods to these temperatures. Accordingly, these polyvinylidene fluorides are capable of readily forming melt films by powder coating.

Moreover, we have found that by using these polymers in flow-dip coating and electrostatic coating, it is possible to form surface films of excellent mechanical properties on various articles.

Not all of the low-temperature suspension polymers prepared in the above described manner, of course, are suitable for powder coating. The conditions for suitability of these polymers for powder coating are as follows:

(1) an intrinsic viscosity of the polymer of from 0.4 to 1.2;

(2) spherical particles of particle sizes distributed between 5 and 300 microns, preferably between 30 and 250 microns, that is, with a peak in the vicinity of 100 microns; and (3) an apparent density of from 0.3 to 0.7 gram/cc.

The intrinsic viscosity $\eta_{inh}$ of a polymer is expressed by the following equation and constitutes a measure of the degree of polymerization of the polymer.

$$\eta_{inh} = \frac{1}{C} \ln \left[ \frac{\eta}{\eta_0} \right]$$

where:

$\eta$ is the viscosity of a solution of the polymer in dimethyl formamide of 0.4 g./100 cc. concentrations;

$\eta_0$ is the viscosity of the dimethyl formamide itself; and C is the solution concentration, 0.4 g./100 cc.

When the intrinsic viscosity is excessively low, the melt viscosity is low, and a film can be readily formed, but it has poor mechanical properties and is brittle. On the other hand, when the intrinsic viscosity is excessively high, the melt viscosity becomes high, and film formation becomes impossible.

Since the process of the invention produces polymers by low-temperature polymerization, these polymers, differing from conventional vinylidene fluoride polymers produced at high temperatures by emulsion or precipitation polymerization, have excellent mechanical properties, exhibit no brittleness, and are capable of forming tough films which can fully withstand severe use, in spite of the relatively low intrinsic viscosities of from 0.4 to 1.2 of the polymers.

That is, a remarkable feature of the polymers of the invention is the very wide ranges of their usable degrees of polymerization in comparison with those of known vinylidene fluoride polymers. The practical production of the vinylidene fluoride polymers according to the invention makes possible, for the first time, their use in powder coating techniques such as flow-dip coating and electrostatic coating, whereby we believe that these polymers have substantial industrial value.

The reason for these superior properties of the vinylidene fluoride polymers produced by the process of the invention may be explained as follows. The low-temperature polymerization in each case produces a polymer having a very regular structural pattern without abnormalities, whereby the crystallinity is excellent. As a result, in comparison with known vinylidene fluoride polymers produced by high-temperature polymerization, a polymer of the invention of the same intrinsic viscosity has a heat deformation temperature which is 10 degrees C. or more higher and has superior heat resistance and mechanical properties. For this reason, even when the degree of polymerization of a polymer of the invention is reduced to lower the melt viscosity, the mechanical properties are not proportionately or appreciably impaired, and the workability of the product is increased.

In powder coating of the instant nature, the fluidity and character of flow of the polymer particles are very important. If excessively coarse and fine particles are present in a batch of the polymer, the coarse particles will sink at the time of flow, and a polymer in the form of powder of uniform particle size cannot be obtained, whereby a uniform film cannot be produced.

Furthermore, admixture of extremely fine particles causes channeling and other impairing effects relative to the flow. Particles such as salted out particles of emulsion polymerization products having irregular shapes also impair the flowing characteristic. Accordingly, spherical particles of particle sizes distributed between 5 and 300 microns have been found to be highly suitable for powder coating. A further undesirable feature of excessively coarse particles is that they require much time to melt at the time when the particles are to be melted and may give rise to the formation of pinholes. Accordingly, it is desirable that the inclusion of coarse particles of greater than 300-micron size be prevented.

The apparent density of the polymer particles is measured in conformance with the specification of A.S.T.M. Designation D-392-38. We have found that an excessively low apparent density results in a thin film produced by a single coat and in a tendency for pin holes to be formed, whereby it is difficult to form a thin film without pin holes, and, furthermore, a greater number of coats are required than in the case where the apparent density is high in order to form a film of the same thickness.

Accordingly, we have found that a suitable and effective apparent density is from 0.3 to 0.7 g./cc. While it is desirable that the apparent density be as high as possible, most of the polyvinylidene fluorides prepared by an ordinary suspension polymerization process have apparent densities which are 0.4 g./cc. or less. Polymers of higher apparent densities can be produced by the method described hereinafter and based on the following consideration.

The specific gravity of the monomer at a polymerization temperature of 25 degrees C. is 0.57, and the true specific gravity of the polymer is 1.78. For this reason, in the suspension polymerization of vinylidene fluoride, the spatial volume is reduced to an extreme degree as polymerization of the liquid droplets of the vinylidene fluoride monomer dispersed in the water proceeds, and, as a result, voids are formed within the polymer particles, whereby the apparent density is reduced.

The relationship between the apparent density and degree of voidage of the polymer particles is indicated in Table 1. The values shown therein are the results of measurements carried out by placing 5 grams of the polymer and an excessive quantity of dioctyl phthalate in a fractionation tube provided with a filter, subjecting this tube to centrifugal force at 3,000 r.p.m. in a centrifugal sedimentation apparatus, removing the surplus dioctyl phthalate, and determining the degree of voidage from the quantity of adhering dioctyl phthalate.

TABLE 1

| Apparent density (g./dl.): | Degree of voidage [1] |
|---|---|
| 17.0 | 135.0 |
| 25.0 | 119.0 |
| 30.0 | 92.0 |
| 35.0 | 80.0 |
| 42.0 | 71.0 |
| 47.0 | 55.0 |
| 52.0 | 48.0 |
| 55.0 | 35.0 |

[1] Cc./100 g. of polymer.

Therefore, in order to increase the apparent density of the polymer, it is necessary to reduce the voids therein. With the object of reducing these voids, attempts to fill these voids by supplementarily adding vinylidene fluoride monomer at an intermediate point in the polymerization process were made, but in most cases, new particles of the polymer were formed from the supplementary monomer. These newly formed polymer particles had particle sizes which were smaller than those of the previously formed particles, and, furthermore, the voids increased in number, whereby it was not possible to obtain uniform polymer particles.

The reason for this appears to be that, simultaneously with the formation of new particles from the supplementary monomer, a portion of the monomer is adsorbed in the already existing polymer voids and is polymerized. However, the already existing polymer particles have a large quantity of catalyst adsorbed thereonto, and the polymerization within the already existing polymer particles proceeds rapidly, whereas the newly formed particles have only a small quantity of catalyst, whereby their polymerization rate is slow. Furthermore, the chain transfer effect due to the catalyst is also reduced. As a result the degree of polymerization generally becomes high, and the intrinsic viscosity ($\eta_{inh}$) becomes high.

It may be considered further that the monomer within the newly formed particles are also captivated by the existing polymer side and reduced in particle size, and, at the same time, the voids increase in size.

As a result of intensive study based on the above mentioned experiments, we have found that it is necessary to prevent the formation of new polymer particles due to supplementary charging of the monomer. Accordingly, this discovery constitutes an essential basis of the present invention and has led to the following process for producing vinylidene fluoride polymers of high apparent density.

Referring to the drawing, the polymerization pressure is initially constant with time as indicated by part 1 of the pressure curve, being determined by the dispersion medium and temperature of the vinylidene fluoride monomer. This constant pressure is maintained until the reaction assumes a state wherein a large quantity of polymers have been formed, and the monomer particles are adsorbed in these polymers, whereupon the pressure decreases as indicated by part 2 of the curve.

At a point $S_1$, supplementary monomer is added, whereupon the pressure rises abruptly to a revival value as at point A. When the quantity of the monomer thus added is less than the maximum quantity of the monomer which can be completely occluded within the voids of the polymers, the polymerization pressure immediately begins to decrease from point A as indicated by part 3 of the curve.

In cases when it is necessary to increase the apparent density even further by supplementary charging of the monomer, the monomer is charged in two or more successive charging steps. The part of the pressure curve from point $S_2$ to point A and along 4 indicates a second supplementary charge of the monomer.

In the practice of the present invention, it is possible to carry out any number of repeated steps of supplementary charging of the monomer depending on the value of the desired apparent density. For example, in the case of polymer particle size of from 5 to 40 microns, an apparent density of from 45 to 47 g./dl. can be attained with one charge, an apparent density of from 48 to 55 g./dl. can be attained with two charges, and an apparent density of 56 g./dl. or higher can be attained with three or more charges. In the case of larger particle sizes, these numbers of charges can be reduced.

By the above described procedure according to the invention, it is possible, by suspension polymerization of vinylidene fluoride monomer at a temperature below the critical temperature thereof, to produce in a simple manner particles of a polyvinylidene fluoride material of substantially spherical shape having an intrinsic viscosity, $\eta_{inh}$, of from 0.4 to 1.2, a particle size of from 5 to 300 microns, and an apparent density of from 0.3 to 0.7 g./cc. Thus, the polyvinylidene fluoride powder thus produced makes possible powder coating with vinylidene fluoride polymer materials by techniques such as flow-dip coating and electrostatic coating, which heretofore has been considered to be difficult.

The term "vinylidene fluoride polymer materials" herein designates, in addition to vinylidene fluoride polymers, polymer materials having physical properties substantially similar to those of vinylidene fluoride polymers and containing at least 80 percent of vinylidene fluoride.

In order to indicate still more fully the nature of the invention, the following examples of procedure and results are set forth, the first two examples, Examples 1 and 2, which relate to examples of forming films by known methods with the use of vinylidene fluoride polymer materials available on the market, being presented for the purpose of comparison and as conducive to an understanding of the nature and utility of the present invention. It is to be undesrtood that Examples 3 through 7, showing examples of embodiment of the invention, are present as illustrative only and that they are not intended to limit the scope of the invention.

EXAMPLE 1

When a polyvinylidene fluoride (a white, amorphous polymer having a particle size of from 0.3 to 0.4 micron, an apparent density of 0.38 g./cc., and an intrinsic viscosity of 1.9) sold on the market was caused by air to flow within a flow vessel, its flow state was poor, and a uniform flow state could not be obtained. Furthermore, the apparent melt viscosity of this polymer when it was extruded under a pressure of 100 kg./cm.$^2$ and at a temperature of 250 degrees C. was $200 \times 10^3$ poise, which is very high.

When an iron block measuring 100 x 35 x 30 mm. and heated for 15 minutes at a temperature of from 360 to 370 degrees C. was dipped for a period of from 15 to 20 seconds in the flowing polymer in the above mentioned flow vessel, the melting of the polymer was incomplete, and the polymer assumed a rough external appearance and did not form a good film. Even when this process was repeated many times, or when the temperature was increased and the dipping time was increased, it was difficult to form a satisfactory film, and, finally, the film became coloured.

EXAMPLE 2

300 parts of water in which 0.5 part of ammonium persulphate, 2 parts of acetone; and 0.3 part of sodium perfluoro-octanate had been dissolved was charged into a 500-cc. autoclave, and the air in the upper part of the autoclave was then replaced by nitrogen, the pressure of which was then reduced, to remove oxygen. 100 parts of vinylidene fluoride monomer was introduced under pressure into the autoclave, and then the interior temperature of the autoclave was raised to 80 degrees C. to cause polymerization. After a polymerization time of 5 hours, a stable latex was obtained.

By salting out and water washing this latex, a white, amorphous polymer having a particle size of from 0.2 to 0.4 micron, an intrinsic viscosity of 0.62, an apparent density of 0.2 g./cc. was produced with a yield of 63.5 percent.

This polymer had poor flow characteristic similarly as in the case of the polymer of Example 1. However, this polymer had a low melt viscosity ($10^3$ poise), and, therefore, when it was used for flow lining by the procedure set forth in Example 1, a film coating of a thickness of approximately 0.1 mm., although having irregularities, could be formed by a single dip.

The iron piece thus coated was heated for 5 minutes at a temperature of from 250 to 280 degrees C. and then dipped again in the flow vessel. By repeating this procedure 8 times, a film of a thickness of approximately 0.7 mm. was obtained.

When this film was peeled off, and its properties were examined, it was found to have a tensile strength of 1.0 kg./cm.$^2$, an elongation of 10 percent, and a modulus of elasticity of 120 kg./cm.$^2$ and was found to be brittle and to develop cracks when subjected to even a slight impact.

EXAMPLE 3

Into a 6-litre autoclave, 2,850 g. of water containing 3 g. of methyl cellulose was charged, and 150 g. of acetone and 10 g. of di-n-propylperoxydicarbonate were added thereto. The space above the charge was flushed twice with nitrogen, and the pressure was reduced thereby to remove oxygen.

1,000 g. of vinylidene fluoride was then introduced under pressure into the autoclave, and polymerization was carried out at 250 degrees C. and under agitation at 800 r.p.m. for 48 hours, whereupon a vinylidene fluoride polymer in the form of spherical particles was obtained with a ploymerization yield of 85 percent. This polymer was found to have the following properties.

PARTICLE SIZE DISTRIBUTION

| Mesh (Tyler) | 60-80 | 80-100 | 100-150 | 150-200 | 200-250 | 250-300 | Pass 320 |
|---|---|---|---|---|---|---|---|
| Particle diameter ($\mu$) | 175-240 | 147-175 | 147-104 | 104-75 | 74-61 | 61-43 | 43 (max.) |
| Percent | 0 | 4 | 48 | 24 | 20 | 2 | 2 |

NOTE.—Intrinsic viscosity=0.64; apparent density=0.35 g./cc.

This polymer was placed in a flow vessel and, when air was introduced, exhibited excellent flow characteristic.

An iron block measuring 50 x 35 x 30 mm. was heated for 15 minutes at from 360 to 370 degrees and dipped for a period of from 15 to 20 seconds in the flowing polymer in the flow vessel, whereupon a uniform, smooth film of a thickness of approximately 0.1 mm. was formed.

The iron block thus coated was further heated for 5 minutes at from 250 to 280 degrees C. and dipped again in the flow vessel. This procedure was repeated 6 times, whereupon a film of a thickness of 0.7 mm. was formed.

This film was found to have a tensile strength of 4.5 kg./cm.$^2$, an elongation of from 10 to 15 percent, and a modulus of elasticity of 130 kg./cm.$^2$ and to have greater toughness than the film of Example 2. This film could not be caused to crack and was found to be amply satisfactory for practical use.

EXAMPLE 4

The same charge as that in Example 3 was used except for a quantity of 60 g. of acetone instead of the 150 g. in Example 3, the procedure of which was followed. After a polymerization of 23 hours, a polymerization yield of 85 percent was attained.

The polymer thus produced was found to be composed of spherical particles which were slightly more coarse than those of Example 3 and to have the following properties.

PARTICLE SIZE DISTRIBUTION

| Mesh (Tyler) | 60-80 | 80-100 | 100-150 | 150-200 | 200-250 | 250-320 |
|---|---|---|---|---|---|---|
| Particle diameter ($\mu$) | 175-240 | 147-175 | 104-147 | 74-104 | 61-74 | 43-61 |
| Percent | 11 | 44 | 26 | 15 | 4 | 0 |

NOTE.—Intrinsic viscosity=0.90; apparent density=0.4 g./cc.

This polymer was placed in a flow vessel and, when air was introduced, exhibited excellent flow characteristic.

An iron block measuring 50 x 35 x 30 mm. was heated for 15 minutes at from 360 to 380 degrees C. and dipped in the flowing polymer in the flow vessel for a period of from 15 to 20 seconds, then heated further in an electric furnace at from 250 to 280 degrees C., and dipped again in the flow vessel. This heating and dipping procedure was repeated 6 times, whereupon a smooth film of 0.7-mm. thickness was formed.

This film was peeled off, and its mechanical properties were measured, whereupon it was found to have a tensile strength of 5.3 kg./cm.$^2$, an elongation of from 30 to 100 percent, and a modulus of elasticity of 137 kg./cm.$^2$.

EXAMPLE 5

The polymer of Example 3 was applied as a coating by the electrostatic coating method in the following manner.

A 120 x 50 x 1.6-mm. iron plate was heated beforehand to a temperature in the vicinity of 250 degrees C. The polymer was applied by electrostatic coating onto this plate by means of a spray gun for electrostatic spraying operated at a tank pressure of 0.1 kg./cm.$^2$ and a spray-gun air pressure of 1 kg./cm.$^2$ to spray approximately 100 g./min. of the polymer. It was found that uniform spraying could be carried out in this manner.

The iron plate thus coated was heated in an electric furnace at 120 degrees C. for 30 minutes and thereafter heated further for 20 minutes at from 240 to 250 degrees C., whereupon the coating melted completely, and a smooth film was formed.

The properties of this film were found to be approximately the same as those of the film of Example 3.

EXAMPLE 6

The polymerization procedure as set forth in Example 4 was carried out, and after 23 hours of polymerization and after the pressure had dropped to 20 kg./cm.$^2$, 200 g. of vinylidene fluoride monomer was newly introduced under pressure, whereupon the pressure again rose to a value of from 37 to 38 kg./cm.$^2$ but immediately began to decrease. At 49 hours, the pressure returned again to 20 kg./cm.$^2$, at which time the polymerization was stopped.

The apparent density of the polymer thus prepared was 0.53 g./cc., which is much greater than that of the polymer prepared in Example 4. The intrinsic viscosity of the polymer was 0.92, and the particle size distribution was substantially the same as that in Example 4.

This polymer was placed in a flow vessel and, when caused to flow, exhibited excellent flow characteristic.

A 50 x 35 x 30-mm. iron block, which had been heated for 15 minutes at from 350 to 380 degrees C., was dipped for a period of from 15 to 20 seconds in the flowing polymer in the flow vessel, heated again for 5 minutes in an electric furnace at from 250 to 280 degrees C., and again dipped in the flowing polymer.

After the first dip, a smooth film coating of 0.15-mm. thickness with very few pinholes was obtained. When the above described heating and dipping procedure was repeated four times, a smooth film of 0.6-mm. thickness with no pinholes was formed.

EXAMPLE 7

2,600 g. of water containing 10.8 g. of methyl cellulose was charged into a 6-litre autoclave, and 720 g. of methanol and 12 g. of di-n-propylperoxydicarbonate were added thereto. The space above the charge was flushed three times with nitrogen, and then its pressure was decreased thereby to remove oxygen. 1,200 g. of vinylidene fluoride was then introduced under pressure into the autoclave.

Polymerization was started at a temperature of 25 degrees C. and with agitation at 800 r.p.m. After 21 hours, at which time the pressure had dropped to 10 kg./cm.$^2$, a charge of 360 g. of supplementary vinylidene fluoride polymer was added to the process materials, and polymerization was continued. At 36 hours, at which time the pressure had again decreased, another charge of 390 g. of supplementary vinylidene fluoride was further added, and at 70 hours the polymerization was stopped. As a result, fine spherical particles of a polymer were obtained with a yield of 78 percent.

The polymer thus prepared had the following properties.

The particle size distribution was such that all particles passed through 320 mesh (Tyler), and by observation through a microscope, it was found the distribution was between 5 and 40 microns, most of the particles being in the size range of from 20 to 30 microns.

The intrinsic viscosity of the polymer was 1.2, and the apparent density was 0.54 g./cc.

This polymer was used in an electrostatic coating apparatus to form a film coating in the following manner. As a 120 x 50 x 1.6-mm. iron plate was heated in an electric furnace at 250 degrees C., the polymer was sprayed thereonto by means of an electrostatic coating apparatus operated with a tank pressure of 0.1 kg./cm.$^2$ and a spray-gun air pressure of 1.0 kg./cm.$^2$. Although the intrinsic viscosity was high, the polymer melted uniformly and readily because of the small particle size and high apparent density.

After a coating of ample thickness was thus applied, the coated plate was further heated for 30 minutes at the same temperature as before and then immediately cooled at a rapid rate, whereupon a lustrous film coating was obtained.

The film thus formed had a thickness of 0.5 mm. and was uniform without any pinholes. The mechanical properties of this film were excellent, the tensile strength being 6.0 kg./cm.$^2$, and the elongation being 60 percent.

Since it is obvious that many changes and modifications can be made in the above described details without departing from the nature and spirit of the invention, it is to be understood that the invention is not to be limited to the details described herein except as set forth in the appended claims.

What we claim is:

1. A process for producing vinylidene fluoride polymer materials suitable for powder coating which comprises dispersively distributing a monomer substance with vinylidene fluoride as its principal constituent throughout a liquid selected from the group consisting of water, acetone, alcohols, and other polar solvents and causing polymerization of the monomer substance at a temperature below 40 degrees C. in the presence of a suspension stabilizer through the use of a radical polymerization catalyst, at least one charge of supplementary vinylidene fluoride monomer being added to the polymerization process when the polymerization pressure has substantially decreased, thereby causing said pressure to rise abruptly to a revival value approaching the initial pressure, said charge being limited to a quantity to cause the pressure to begin decreasing immediately upon reaching said revival value.

References Cited

UNITED STATES PATENTS

| | | | |
|---|---|---|---|
| 2,435,537 | 2/1948 | Ford et al. | 260—92.1 |
| 3,193,543 | 7/1965 | Ragazzini et al. | 260—92.1 |

FOREIGN PATENTS

| | | | |
|---|---|---|---|
| 1,419,741 | 10/1965 | France | 260—92.1 |
| 590,817 | 6/1947 | Great Britain | 260—92.1 |

JOSEPH L. SCHOFER, Primary Examiner

J. A. DONAHUE, Jr., Assistant Examiner